3,295,821
VOLUME CONTROL DAMPER UNIT

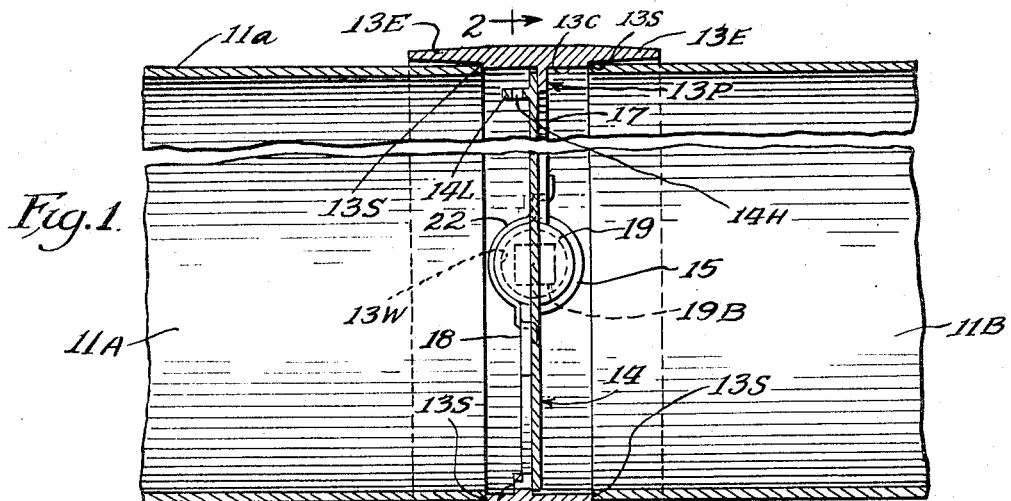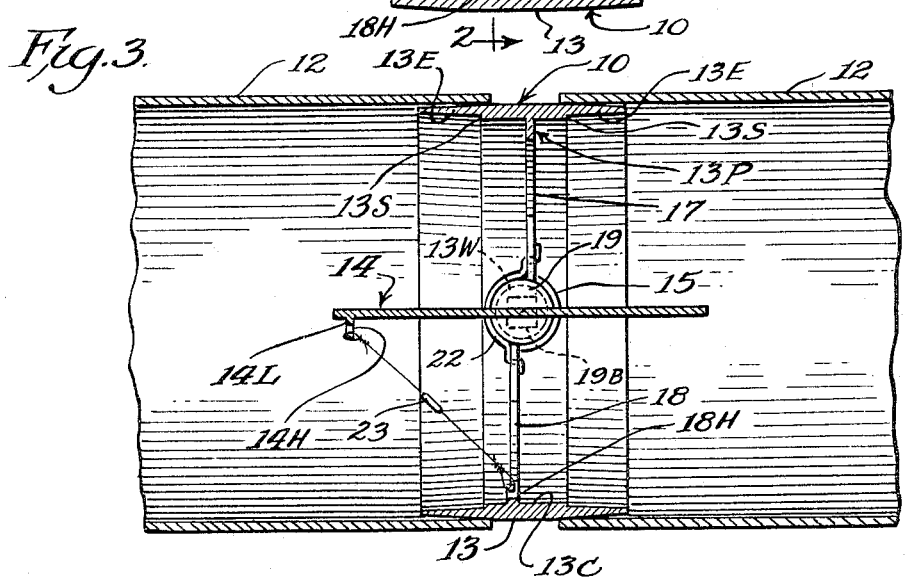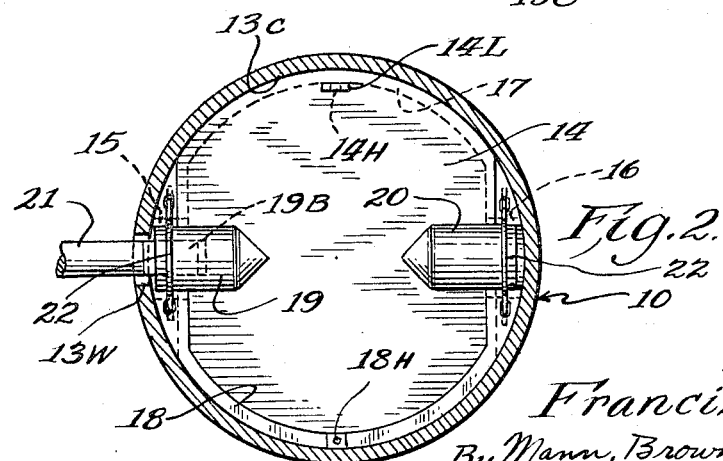

Francis G. McQuown, Bloomington, Ill., assignor, by mesne assignments, to Modine Manufacturing Company, a corporation of Wisconsin
Filed July 2, 1964, Ser. No. 379,913
5 Claims. (Cl. 251—305)

This invention relates to a volume control damper unit and more particularly to such a unit for use in high velocity air ducts.

The principal object of the invention is the provision of an improved damper unit for high velocity air ducts.

Another object of the invention is the provision of a damper unit construction that mates with standard operator shafts and that is suited for easy installation inside round ducts or for receiving stub ducts within it.

A specific object of the invention is the provision of a simplified damper unit of die cast aluminum construction to assure exact size and enable tight closing.

Other and further objects of the present invention will be apparent from the following description and claims, and are illustrated in the accompanying drawings which show structure embodying preferred features of the present invention and the principles thereof, and what is now considered to be the best mode in which to apply these principles.

FIG. 1 is a lengthwise sectional view illustrating the damper unit of this invention in association with a pair of stub ducts, with the blade being shown in closed position;

FIG. 2 is a transverse sectional view taken on the line 2—2 of FIG. 1; and

FIG. 3 is a lengthwise sectional view illustrating the damper as applied inside of a round duct with the damper blade shown in open position.

Referring now to the drawings, the damper unit of this invention is designated generally at 10 and is shown in FIG. 1 in an arrangement wherein stub ducts 11A and 11B project into its opposite ends and it is shown in FIG. 3 in an arrangement wherein it projects inside of a round duct 12.

The damper unit of this invention is arranged to be used in a variety of duct mounting relationships, and in particular it is employed in high velocity air ducts so that it must be able to provide tight seals. The various mounting conditions to be encountered are satisfied by a die cast aluminum part construction wherein an aluminum frame 13 is in the form of a tubular casing having an internal peripheral wall structure 13P, certain portions of which define bearing mounts and other portions of which define blade stop flanges and wherein a damper blade 14 in the form of a plate having a generally rounded outline configuration is matched to the outline configuration of the internal peripheral wall structure of the casing to enable ready assembly of the blade 14 into the casing 13 to function in tight sealing relation thereto.

The casing 13 is a one-piece die cast aluminum part with its internal peripheral wall structure 13P being integral therewith and being composed of semi-circular shaped bearing flanges 15 and 16 located at laterally opposite regions of the casing to define peripheral pockets that are aligned laterally of the casing and interconnected by semi-circular peripheral stop flange segments 17 and 18 which are offset axially of the casing a distance equal to the blade thickness. In the orientation in which the damper unit is illustrated herein, the segment 17 is uppermost and it joins the corresponding upper regions of the bearing flanges 15 and 16 while the segment 18 is lowermost and it joins the corresponding lower regions of the bearing flanges 15 and 16.

The damper blade 14 is also a one-piece die cast aluminum part and is provided with enlarged integral peripheral journals 19 and 20 projecting oppositely to engage in the pockets provided by the flanges 15 and 16 for mounting the blade in the casing. High accuracy in the offset relationship of the segments is achieved in the die cast construction, thus permitting the blade to close tightly against these segments. The main wall of the casing is circular in cross-section as is apparent in FIG. 2 and it includes a cylindrical central region 13C on which the peripheral wall structure is located and identical end regions 13E. The casing presents generally cylindrical exterior surfaces that are of maximum diameter at the center section 13C and taper inwardly in the direction of each end of the casing. This enables insertion of the casing into a round duct 12 as illustrated in FIG. 3 with tight fit and proper exterior sealing being assured. Correspondingly, the casing has a generally cylindrical interior surface that is of minimum diameter at the central section 13C and that tapers outwardly towards each end from an axially inwardly offset, axially outwardly directed annular shoulder 13S that functions as a duct stop.

The integral journals 19 and 20 are preferably greatly enlarged relative to the thickness of the body of the damper blade 14 to present broad bearing contact surfaces and one of the journals 19 is provided with a non-circular bore 19B opening endwise outwardly towards a casing wall opening 13W to receive a standard operator shaft 21 as illustrated in FIG. 2. Spring clips 22 in the form of arcuate retainer bands are applied to span the open faces of the bearing pockets after the blade journals are seated and the ends of the spring clips are hooked into suitable openings provided in the blade stop segments 17 and 18 to secure the clips and hence the blade in mounted position within the casing.

The illustrated damper construction also finds particular use as a fire damper and, as illustrated in FIG. 3, the blade 14 is provided with a raised lug 14L adjacent its upper edge and the blade stop segment 18 is provided with a mounting hole 18H to receive a fusible link 23 which normally holds the damper blade at a prescribed open position against the action of an external wind up operating spring (not shown) which serves to close the damper when the fusible link 23 melts.

Thus, while preferred constructional features of the invention are embodied in the structure illustrated herein, it is to be understood that changes and variations may be made by those skilled in the art without departing from the spirit and scope of the appending claims.

What is claimed is:

1. A volume control damper unit comprising a round frame in the form of a one-piece die cast tubular casing having internal semi-circular bearing flanges at laterally opposite regions of the casing to define peripheral journal pockets aligned laterally of the casing and having open faces directed axially thereof, said casing having complementary internal semi-circular peripheral stop flange segments offset axially of the casing and each joining corresponding regions of said bearing flanges to define a generally rounded outline configuration, a damper blade in the form of a one-piece die cast plate having a generally rounded outline configuration matched to the outline configuration of said segments and having integral peripheral journals projecting oppositely to engage in said pockets for mounting said blade in the casing, and retainer means engaging said segments and spanning said pockets to retain said journals.

2. A volume control damper unit comprising a round frame in the form of a one-piece die cast tubular casing having internal semi-circular bearing flanges at laterally opposite regions of the casing to define peripheral journal pockets aligned laterally of the casing and having open faces axially thereof, said casing having complementary internal semi-circular peripheral stop flange segments offset a prescribed distance axially of the casing and each joining corresponding regions of said bearing flanges, a damper blade in the form of a one-piece die cast plate having a generally rounded outline configuration matched to the outline configuration of said segments and having integral peripheral journals projecting oppositely to engage in said pockets for mounting said blade in the casing, said plate having a thickness dimension corresponding to said distance and said journals being greatly enlarged relative to said thickness dimension, and retainer means engaging said segments and spanning said pockets to retain said journals.

3. A volume control damper unit comprising a round frame in the form of a one-piece die cast tubular casing having internal semi-circular bearing flanges at laterally opposite regions of the casing to define peripheral journal pockets aligned laterally of the casing and having open faces directed axially thereof, said casing having complementary internal semi-circular peripheral stop flange segments at a midlength region and offset axially along the casing and each joining corresponding regions of said bearing flanges to define a generally rounded outline configuration, said casing having each end thereof presenting a generally cylindrical exterior surface that tapers inwardly in a direction towards such end and presenting a generally cyindrical interior surface that tapers outwardly in a direction towards such end and is bounded by an axially inwardly offset, axially outwardly directed duct stop surface, a damper blade in the form of a one-piece die cast plate having a generally rounded outline configuration matched to the outline configuration of said segments and having integral peripheral journals projecting oppositely to engage in said pockets for mounting said blade in the casing, and retainer means engaging said segments and spanning said pockets to retain said journals.

4. A volume control damper unit comprising a round frame in the form of a one-piece die cast tubular casing having complementary internal semi-circular peripheral stop flange segments offset a prescribed distance axially of the casing and interconnected by semi-circular bearing flanges that define journal pockets at opposite sides of the casing and aligned laterally thereof and having open faces directed axially of the casing, said casings having each end thereof presenting a generally cylindrical exterior surface that tapers inwardly in a direction towards such end and presenting a generally cylindrical interior surface that tapers outwardly in a direction towards such end and bound by an axially inwardly offset, axially outwardly directed duct stop surface, a damper blade in the form of a one-piece die cast plate having a generally rounded outline configuration matched to the outline configuration of said segments and having integral peripheral journals projecting oppositely to engage in said pockets and mount said blade in said casing, said plate having a thickness dimension corresponding to said distance and said journals being greatly enlarged relative to said thickness dimension, and retainer means engaging said segments and spanning said pockets to retain said journals.

5. A volume control damper unit comprising a round frame in the form of a one-piece die cast tubular casing having continuous internal peripheral wall structure providing opposed bearings at opposite regions and complementary blade stop flanges extending therebetween, a damper blade in the form of a one-piece die cast plate having a generally rounded outline configuration corresponding to that of said peripheral wall structure and having integral journals at opposite regions thereof and greatly enlarged relative to the thickness of said plate, one of said journals having a socket of non-circular outline opening endwise outwardly to receive a standard operator shaft, and retainer means engaging said flanges and spanning said pockets to retain said journals.

References Cited by the Examiner

UNITED STATES PATENTS

| | | | |
|---|---|---|---|
| 154,039 | 8/1874 | Hager | 126—292 |
| 314,121 | 3/1885 | Gilman | 126—287.5 |
| 654,045 | 6/1900 | Anderson | 251—308 X |
| 1,012,266 | 12/1911 | Miller | 126—292 |

M. CARY NELSON, *Primary Examiner.*

R. C. MILLER, *Assistant Examiner.*